United States Patent
Carvalho et al.

(10) Patent No.: US 6,326,598 B1
(45) Date of Patent: Dec. 4, 2001

(54) NON-INTRUSIVE FAULT LOCATION SYSTEM FOR AN OVERHEAT DETECTION SYSTEM

(75) Inventors: Carlos E. Carvalho, Tyngsboro; Donald O. Hallee, North Easton, both of MA (US)

(73) Assignee: Kidde Technologies, Inc., Wilson, NC (US)

( * ) Notice: Subject to any disclaimer, the term of this patent is extended or adjusted under 35 U.S.C. 154(b) by 0 days.

(21) Appl. No.: 09/761,876

(22) Filed: Jan. 17, 2001

(51) Int. Cl.$^7$ .................................................. H05B 1/02
(52) U.S. Cl. .................. 219/505; 219/501; 219/212; 219/497; 338/26; 340/370.25
(58) Field of Search ..................................... 219/212, 504, 219/505, 501, 494, 497, 499; 338/22 R, 225 C, 26; 340/870.25, 870.26, 870.17

(56) References Cited

U.S. PATENT DOCUMENTS

| | | | |
|---|---|---|---|
| 2,483,793 | * 10/1949 | Thomas | 200/143 |
| 5,185,594 | * 2/1993 | DeChurch | 340/596 |
| 5,294,909 | 3/1994 | Frazier | 338/26 |
| 5,313,185 | * 5/1994 | DeChurch | 338/22 R |

* cited by examiner

Primary Examiner—Mark Paschall
(74) Attorney, Agent, or Firm—Leydig, Voit & Mayer, Ltd (57) ABSTRACT

An overheat event location module for use with an existing overheat detection system in an aircraft. The module is non-intrusively connected to the overheat detection system, yet senses currents in the system. The module, by way of the sensed currents is able to distinguish true overheat events from false events (normally created in a test mode) and normal non-overheat conditions. The module is able to respond to the occurrence of an overheat event by measuring the currents in the sensing cable loop, then using the measured currents to produce an estimate of the position in the loop at which the overheat event occurred. Conveniently the module records both the fact of the event and its location, such that subsequent maintenance actions are facilitated.

24 Claims, 6 Drawing Sheets

NON-INTRUSIVE FAULT LOCATION SYSTEM FOR AN OVERHEAT DETECTION SYSTEM

FIELD OF THE INVENTION

This invention relates to overheat detection systems of the type used in aircraft for monitoring duct leaks, and more particularly to an event location system useful for identifying the location of a leak.

BACKGROUND OF THE INVENTION

A large number of duct leak and overheat detection systems in operation today are zone-type systems. As with any duct leak and overheat detection system, sensor loops, comprising elongate sensing cables, are installed along the aircraft's bleed air duct and adjacent heat sensitive components. The sensors are configured in loops, and there are one or two loops for each zone being monitored. The problem with these systems is that during maintenance of the aircraft it is difficult to locate exactly where, along the length of the loop, the overheat event had occurred. In situations where faster maintenance action is warranted, the loops are broken down into smaller more manageable sections, but at the expense of more wires and associated weight. In cases where the loop is monitoring a very long section of ducting, such as that which might be associated with the auxiliary power unit in certain aircraft, troubleshooting a duct leak can take days to accomplish.

Systems have been configured for newer aircraft which incorporate a maintenance feature that automatically detects and displays the location of the overheat event. These systems utilize a controller which measures current into both ends of the cable loop, and performs a bridge-type calculation to determine or estimate where in the loop a fault had occurred. These systems often use special sensor cables of fairly precisely controlled resistance per unit length, and the controllers are configured such that event location and overheat detection are performed by common hardware and software.

The newer controllers, however, are not suitable for installation in existing aircraft with existing cable systems. To install a newer system in an existing aircraft would typically require the removal of the existing duct leak and overheat detection system, including the cables and the controller, and the replacement with a completely new system.

Components associated with the in-flight operation of the aircraft are certified for use only after extensive testing according to strict protocols. Thus, for example, if one were to attempt to modify an existing overheat detection system controller to provide it with event location capabilities, and the addition required an actual modification to the overheat detection controller, the entire controller would need to be retested and re-certified. This is particularly troublesome for aircraft operators because the event location system is intended solely for maintenance personnel, although it interfaces with the overheat detection system which is operative during flight. The overheat detection system provides indicators in the cockpit for signaling the pilot of any overheat conditions, and also has test buttons which allow the pilot to test the system, for example, during pre-flight checks. It would be highly undesirable to require re-certification of the overheat detection system solely to provide a maintenance capability to assist the maintenance personnel.

SUMMARY OF THE INVENTION

In view of the foregoing, it is a general aim of the present invention to provide an event location module capable of operating with existing overheat detection systems and which interfaces with those existing systems "non-intrusively". By non-intrusively is meant that any normal electronic failure in the event location module will not affect the operability of the overheat detection system; in the preferred practice of the invention, the event location module interposes no electronic components in the existing overheat detection system.

Thus, it is a general object of the present invention to provide an event location module which can be retrofit to an aircraft using an existing overheat detection system, and without the necessity for re-certifying the overheat detection system.

A more specific object is to provide a monitoring module for use with an existing overheat detection system, configured to be commanded into operation in response to currents in the overheat detection loop at a level indicating an overheat event, and to perform calculations which identify the location of the event, then to store event information including at least location and preferably also time of event.

Test systems for existing overheat detection systems create currents in the loop to test for loop continuity. These currents, being at a relatively high level, can be mistakenly interpreted as an overheat event. In the normal "run mode" the typical overheat detection system drives both ends of the cable loop so as to draw very little current, then monitors for a higher current condition indicative of an overheat event somewhere in the loop. In the "test mode" the system switches to drive one end of the loop and ground the other, which tests the continuity of the loop, but also passes current at a level similar to an overheat event.

According to an important aspect of the invention, it is an object to determine whether the overheat detection system is in the run mode or the test mode by sensing the currents in the loop, and to record an overheat event only when such an event is detected in the run mode, but not in the test mode.

Stated more broadly, it is an object to record all overheat events detected in the normal run mode, but to ignore, for purposes of recording, those "events" which are produced in the test mode.

Other objects and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
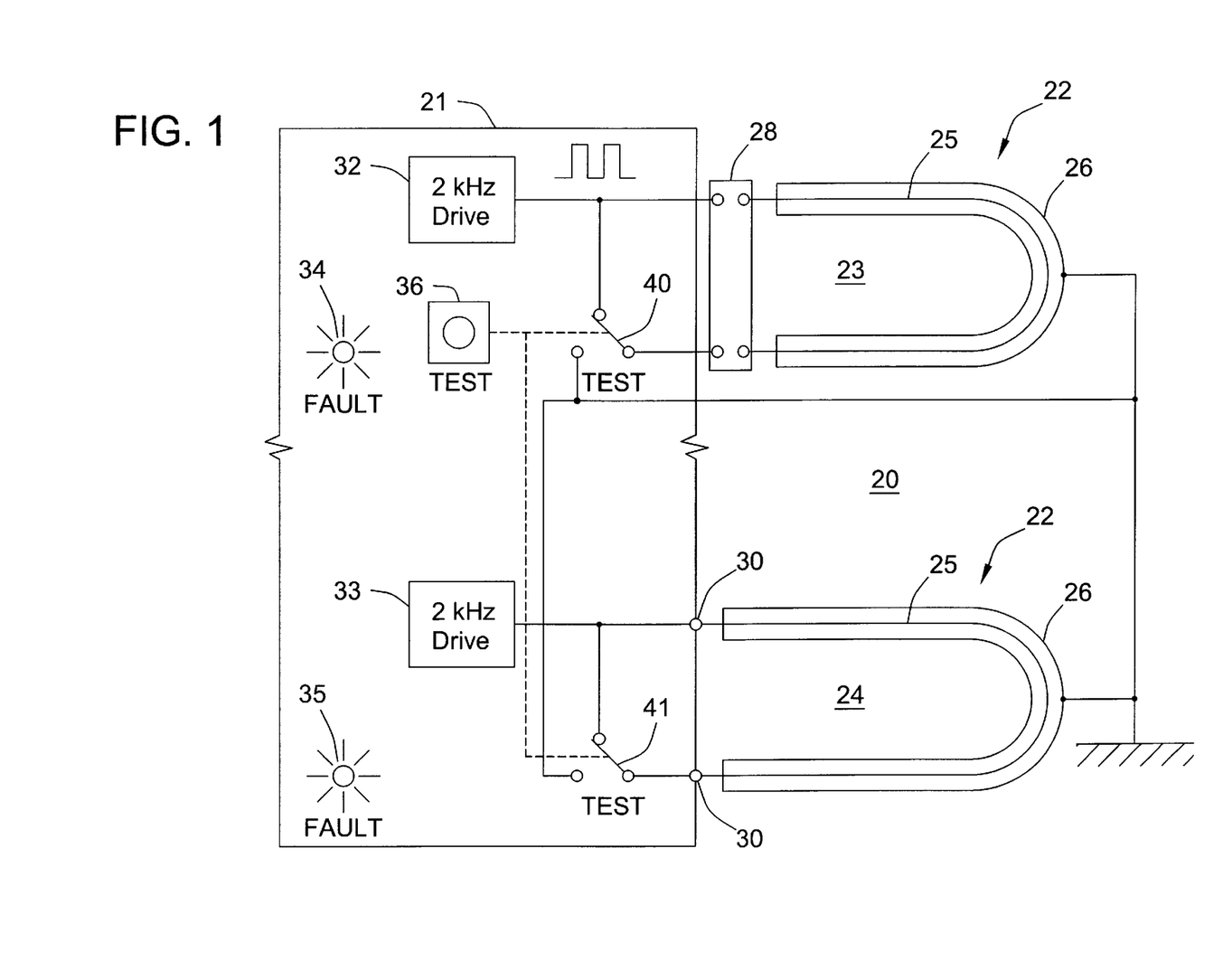
FIG. 1 is a diagram showing a conventional overheat detection system with a test mode capability.

Turning now to the drawings, FIG. 1 shows an overheat detection system 20 which includes a bleed air monitor computer 21 and a plurality of sensor loops 22. In the FIG. 1 embodiment only two loops 23, 24 are illustrated, but the controller has capability for additional loops.

Focusing on the control loop 23, which is representative of the others, it is in the form of an elongate cable having a central core 25 and an outer sheath 26. The core and sheath are separated in a coaxial-cable like configuration by a material which is adapted to locally melt when heated, to create a low resistance path between the core and the sheath at the localized position where the cable was heated. The loop 23 is configured as a long cable, and in some applications, such as for the bleed air duct for the auxiliary power unit, may be 200 feet long or more. Those skilled in the art will appreciate that it is made up of a number of individual cable sections connected by intermediate connectors or at terminal blocks. As shown in FIG. 1, the sheath is grounded, and both ends of the core are connected to the controller 21. In the case of loop 23, the core is connected to the controller 21 by way of a terminal block 28. The cable 24 is structured like the cable 23, except that no terminal block is used for connection to the controller. Instead, the central conductor 25 of the cable 24 is brought back directly to the controller 21 and is attached thereto, such as by connectors 30.

The module 21, sometimes referred to as a bleed air monitor computer, has a number of functions. The function of interest in the present application is the capability to drive the cable loops 22 and sense the current levels in the loops. To that end, the controller 21 includes a drive circuit 32, 33 for each of the cable loops. For example, in one practical embodiment, the drive circuits are 2 kHz square wave drivers providing a 2 kHz output pulse train of about 6.6 volts peak to peak. The example of a 2 kHz square wave drive will be used in this detailed description, but it must be appreciated that the system of the invention will work with other frequencies and waveshapes. The resistance of the cable, as measured from the center conductor 25 to the outer sheath 26, is usually very high; when there is no overheat condition only microamps are drawn in the cable from core to sheath. However, when an overheat condition occurs, the short between the core and sheath to ground (to which the sheath is connected) causes a substantial increase in current flow, on the order of 10 milliamps or more. That increased current flow is sensed by circuitry (not shown) internal to the controller 21, which responds by issuing a warning, such as by lighting a fault light 34, 35 associated with the channel which had produced the higher current readings.

For connecting the drive circuits 32, 33 to the loops 23, 24, test contacts 40, 41 are provided. In the normal condition, which is illustrated in the drawing, the test contacts supply the 2 kHz drive to both ends of the loop. Since the loop is insulated from the grounded sheath in the normal condition, as explained above there will be very little current flow. However, when an overheat condition causes a core to sheath short, current will flow at that overheated location from both ends of the cable and will increase as has been described.

Operator controls and readouts for the bleed air monitor computer are available to the flight crew in the cockpit. At appropriate times, such as during pre-flight checks, it may be necessary to test the overheat detection system. For that purpose, a test switch actuator 36 is provided to switch all the test contacts 40, 41 to their alternate or test position. The test switch, for example, can be connected to a relay which operates the test contacts 40, 41. Thus, when the test switch 36 is actuated, the contacts 40, 41 switch to their alternate condition. In that condition, the upper ends of the cores 25 remain connected to the 2 kHz drive, but the lower ends are switched to ground, such that current flow is at a higher level through the entire cable. This tests the loop for continuity, substantially raising current flow to above the limit value, which is detected by the internal circuitry of the controller 21 to light the fault light 34. Each channel can be tested to assure that all circuits are working, and all of the loops are intact.

A system of the type illustrated in FIG. 1 provides no mechanism for determining where in the loop an overheat event has occurred. In accordance with the invention, a module is provided for use in connection with a system such as illustrated in FIG. 1, to provide overheat location information for the maintenance crew. Furthermore, the module is configured so that it is associated with the system of FIG. 1 in a non-intrusive fashion. As a result, the system of FIG. 1, once flight tested and certified can retain its certification, because it has not been altered by the event location module now to be described. In effect, the event location module senses currents in the system of FIG. 1, but does so with mechanisms which do not place any electronic components directly in the circuitry or system of FIG. 1. The currents are sensed non-intrusively, and the controller which determines event location information, operates only on those currents, and with no other needed electrical connections to the control system of FIG. 1.

Figures 2, 8:
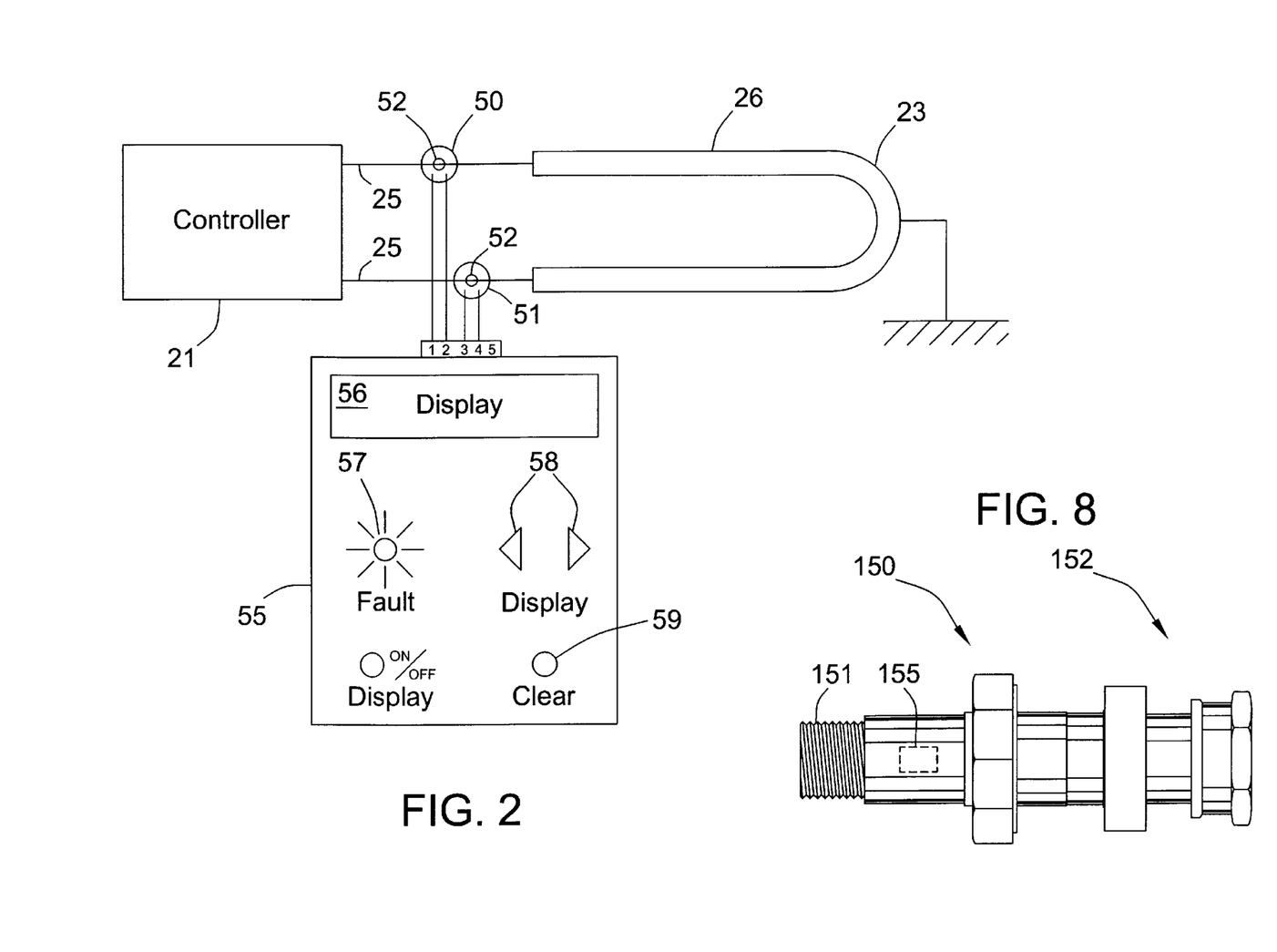
FIG. 2 is a diagram illustrating an event location module in accordance with the present invention and its relationship to one channel of an overheat detection system.
FIG. 8 is a drawing showing an isolation device useful in certain embodiments of the invention.

Turning then to FIG. 2, there is shown in schematic fashion the computer module 21 connected to a single loop 23, representative of the lurality of loops 22. The loop 23 has a central core 25 connected to the controller 21. The sheath 26 is connected to ground as illustrated.

In practicing the invention a pair of current sensors, in the present instance a pair of current transformers 50, 51, are associated with the respective ends of the core 25 to sense current in the core at its respective ends. The current transformers 50, 51 have open apertures 52 at their centers, through which the ends of the core 25 are passed. With this embodiment it is not necessary to cut or otherwise break the ends of the core; they are simply removed from the controller, placed through the core of the associated transformer 52, then reattached to the controller. The 2 kHz currents flowing in the core 25 are then sensed by the transformers 50, 51 to provide signals to an event location module 55. No other connections need be made to the bleed air monitor control system of FIG. 1.

The controller 55 is illustrated at a very general level in FIG. 2. It will be seen that it contains a display section 56 which is preferably an alphanumeric display driven by an internal processor to display event location information. The event location information could include time of occurrence of the event, the loop in which the event occurred, and the location in the loop at which the event occurred. The location can be displayed such as by means of a percentage from the start point of the loop. Alternatively, percentages which are determined by an algorithm resident in the internal processor, can be translated by means such as a table, into locations in the aircraft. Accordingly, the display can simply then display a message understandable to a maintenance worker, such as "Bulkhead XY" to identify with specificity the location of a particular overheat event.

The controller can have additional display indicators, such as a flashing LED 57, which indicate that a fault has occurred since last servicing. A pair of directional push buttons 58 or other operator controls are provided to sequence through the display. A clear button 59 is provided to clear an event once the maintenance personnel have attended to it.

Figure 3:
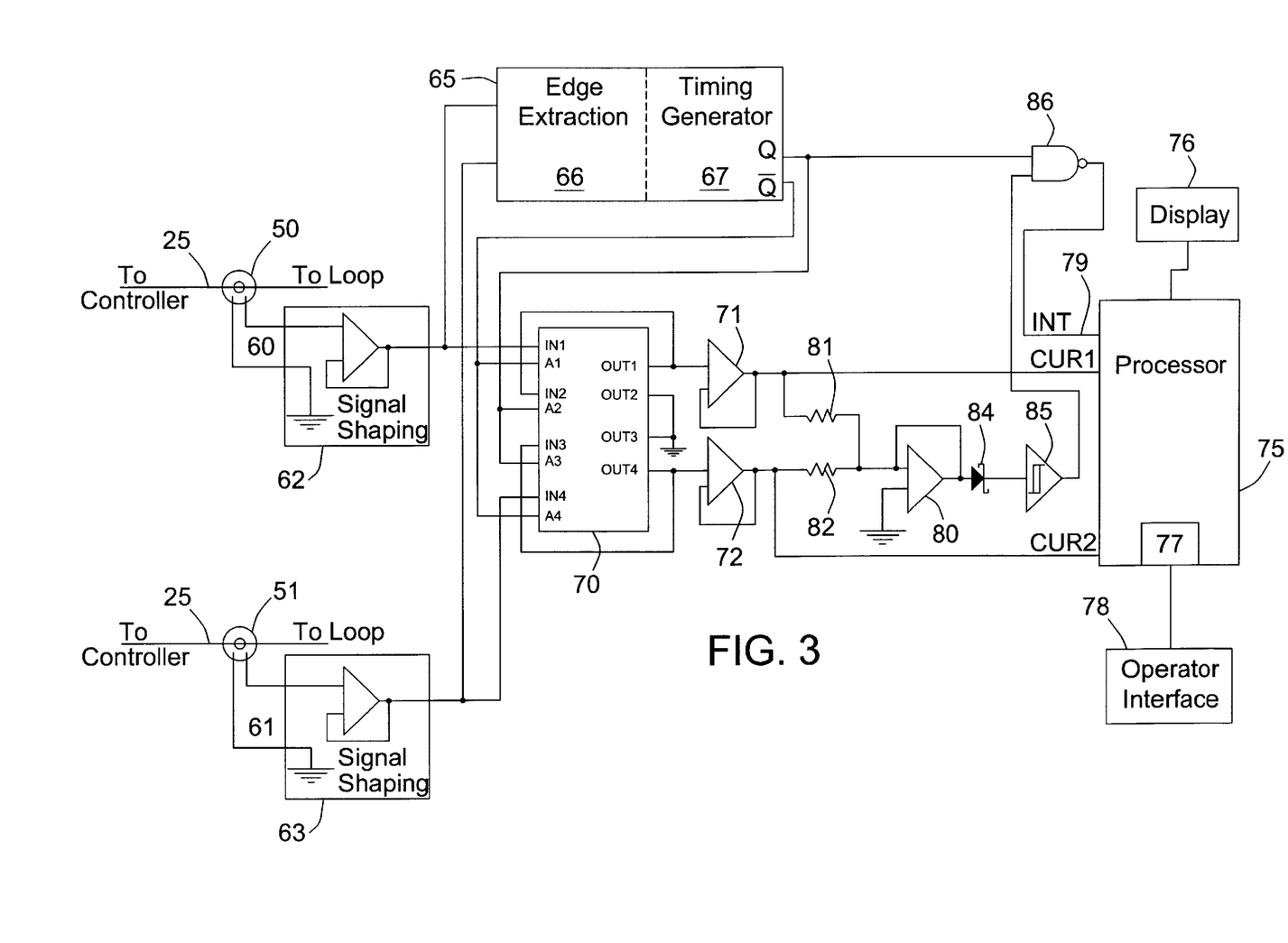
FIG. 3 is a diagram at a more detailed schematic level illustrating the functional relationship between circuit components which make up a first embodiment of the event location module.

Turning to FIG. 3, there is shown in somewhat more detail one embodiment of a circuit configuration structured to function in accordance with the present invention. The system utilizes current sensor circuits which respond to current flow at the respective ends of the loop, and produce signals which are processed for two types of information: 1) a determination that an actual overheat condition (as opposed to a false overheat condition created by depression of the test button) has occurred, and 2) when an overheat event occurs, a determination, based on the sensed currents, of the location of the event along the cable. The system is further programmed to respond to the detection of an overheat event by storing information in a memory for later display to maintenance personnel.

Thus, as shown at the left of FIG. 3, the ends of the cable center conductor 25 are associated with non-intrusive current sensors. In the illustrated embodiment the ends of the center conductor 25 pass through the center apertures in the current transformers 50, 51. Each current transformer has a pair of output signal leads 60, 61, and those leads are coupled to respective signal shaping circuitry blocks 62, 63, sometimes referred to as current to voltage converters. The signal shaping circuitry will be described in greater detail below, but basically it functions to monitor the currents sensed by the associated current transformer and produce an output voltage which is representative of the current being sensed.

Also connected to the current sensors 50, 51 and functioning as part of the current sensing circuitry are circuits which extract magnitude and phase information from the signals supplied by the current transformers. Two examples of such circuits will be given in the present disclosure. In connection with the FIG. 3 embodiment, the circuitry includes elements which synchronize the system with the incoming pulse train (2 kHz square pulses in the present example), extract timing information, and use that timing information to sample the incoming signal. More particularly, timing information from the signal passed by the current to voltage transducers 62, 63 is extracted by means of timing circuitry 65. That circuitry includes an edge extraction module 66 which can comprise high gain amplifiers connected to sense the rising and trailing edges of the 2 kHz pulses. The edges thus detected are coupled to a timing generator 67 which can comprise a pair of monostable multivibrators having periods related to the 2 kHz wave. Such generators are triggered by the edge extraction circuitry to produce a pair of output signals identified as Sample and Clamp. The Sample and Clamp signals are coupled to an analog multiplexer 70 whose inputs are coupled to the signal shaping modules 62, 63.

Without intending to limit the invention, reference will be made in greater detail to one practical implementation of the timing and multiplexing circuitry. In an existing system, the 2 kHz square wave exhibited an overshoot characteristic on the leading edge of each pulse. Allowing the overshoot to contribute to the loop current measurements would have created unwanted errors. In order to measure the magnitude of the current pulses, while ignoring the contribution of the overshoot, a 2 phase timing generator was configured, as shown in FIG. 3. Immediately on detection of a leading edge of an incoming pulse, a short duration Clamp pulse is generated, and coupled to the A2 and A3 inputs of the multiplexer 70. Since inputs In2 and In3 are coupled to outputs 1 and 4 respectively, and since outputs 2 and 3 are coupled to ground, this has the effect, for the duration of the clamp pulse, of clamping outputs 1 and 4 (the 2 signal outputs) to ground. The duration of the clamp pulse was determined experimentally to approximately coincide with the duration of the overshoot in the 2 kHz square wave. Immediately upon the trailing edge of the Clamp pulse, a Sample pulse is generated. It is seen that the Sample pulse is coupled to the A1 and A4 inputs of the multiplexer 70, such that the signal received from the signal shaping circuits 62, 63 is coupled to the multiplexer outputs 1 and 4 respectively for the duration of the Sample pulse. The multiplexer outputs are passed through buffer amplifiers 71, 72 to produce analog signals having voltage levels related to the sensed current levels, and which are used for additional processing. Those signals are identified in the drawing as Cur1 and Cur2, and are used for performance of two functions. A first is to provide voltage levels to processor 75 which can be digitized and used in a bridge-type algorithm for estimating the location of a fault. The second is to provide the capability to compare the signals to discriminate between an actual fault condition and a false fault resulting from a test operation.

In summary for the FIG. 3 embodiment, the current signals sensed by the current transformers are converted to voltage signals in the signal shaping circuits 62, 63. The timing and multiplexing circuitry extracts timing information, cleans up the signals and produces output signals having a magnitude and duration determined by the current pulses originally sensed. Those signals are then processed to detect whether an overheat condition is in effect, and if it is, to estimate where along the cable the event has occurred.

As will be seen in FIG. 3, the current signals are coupled to a processor module 75 which is preferably a microprocessor or microcontroller. The processor 75 is programmed to contain an algorithm based on resistance bridge measurements to determine, from differences between Cur1 and Cur2, the location in the cable at which any overheat condition might have occurred. The processor 75 operates with a display 76 to display that information, and a memory 77 to record that information for maintenance personnel. The operator interface 78 is also available to drive the display and control the memory 77.

In accordance with the invention, only real event information is stored in the memory 77, and the processor is configured to ignore either the normal operating condition where no overheat event has occurred, or the test condition. In the presence of an actual overheat condition, a "fault present" circuit commands the processor to perform the computation which produce event location information. In the FIG. 3 embodiment, the start calculate signal is produced by circuitry external to the processors 75, and the interrupt input 79 of the processor is used as a triggering command.

Placing a signal on the interrupt input 79 causes the processor to perform the programmed routines to measure currents, calculate event locations, and store that information for later display and use. Without the production of an interrupt signal, no such information is stored, and the processor need not even measure the current signals.

In practicing FIG. 3 implementation of the invention, the interrupt input is driven by the circuitry of the module which compares the currents (in the illustrated embodiment voltage signals representative of the currents) to determine two conditions: a) whether they are sufficiently high to represent an overheat condition, and b) whether their phase is such that the condition is caused in the normal run mode rather than in a test mode. It will be seen that a summing amplifier 80 is connected to receive the Cur1 and Cur2 signals through summing resistors 81, 82, preferably of the same value. When the system is in the normal run mode, the currents through both of the sensors 50, 51 are in the same direction, and the circuitry is phased such that the two signals through the summing resistors 81, 82 will sum to create a larger signal at the input of summing amplifier 80. Thus, in the overheat condition the summed signals are sufficiently large to overcome the threshold of a threshold device 84, such as a zener diode, to produce an output in a hysteresis amplifier 85. That output signal is coupled to a NAND gate 86 which also has the Clamp output of the timing generator 67 coupled thereto. Thus, when the Clamp signal is inactive, and if the Cur1 and Cur2 signals passed through the summing resistors 81, 82 are in the same phase and produce a sum which is sufficiently high, the NAND gate 86 will be satisfied to generate an interrupt signal at its output. That interrupt signal will cause the processor to sense the currents as will be described below.

Assume however that currents in the loop have risen, but due to a false overheat condition caused by depression of the test switch. In that case the current through one of the current sensors 50 or 51 will be in the opposite direction to that normally encountered because the associated cable end is connected to ground rather than being driven. As a result, the current through the signal shaping circuits 62 will be opposite to the phase of the current through signal shaping circuit 63 producing Cur1 and Cur2 signals through summing resistors 81, 82 which are of similar magnitude but opposite phase. Adding the out of phase signals in amplifier 80 will produce an output which is insufficient to overcome the threshold device 84 or to generate an interrupt signal.

Similarly, when there is no fault condition in the loop, either actual or simulated, the currents in the loop will be sufficiently low, that even though they are summed at the input of amplifier 80, the output will not be adequate to overcome the threshold device 84, and no interrupt signal will be generated.

Considering that the system of the example operates on a 2 kHz drive, and considering that the timing generator 65 is involved in generating the interrupt signals, in the event an actual overheat condition is detected, the interrupt signals will be generated at about the rate of 4,000 interrupts per second. When receiving interrupts, the processor 75 will read both analog inputs Cur1 and Cur2 continually.

The Cur1 and Cur2 signals, after being digitized by the processor, can be handled in numerous ways to achieve the results of the invention. In one example, for processing the measured signals to estimate the location of the overheat event, the processor sums the measured current signals, and when the sum is greater than a given threshold, e.g. 3 volts RMS in one example, it will continue monitoring the analog inputs for approximately 500 milliseconds. If he sum remains greater than the threshold for that period, the processor will then compute the average of the two input analog signals for 64 or more concurrent readings taken over a period of between 100 milliseconds to 250 milliseconds. The processor will then average the reading and by virtue of bridge type equations, compute the location of the event. The processor is programmed to continue to monitor the event, to record the time and duration of the event. It is further programmed to cooperate with the threshold module 84 to terminate an overheat event when the sum of the processed analog signal falls below a predetermined level, such as two volts RMS for a period of greater than about 250 milliseconds.

Figure 4:
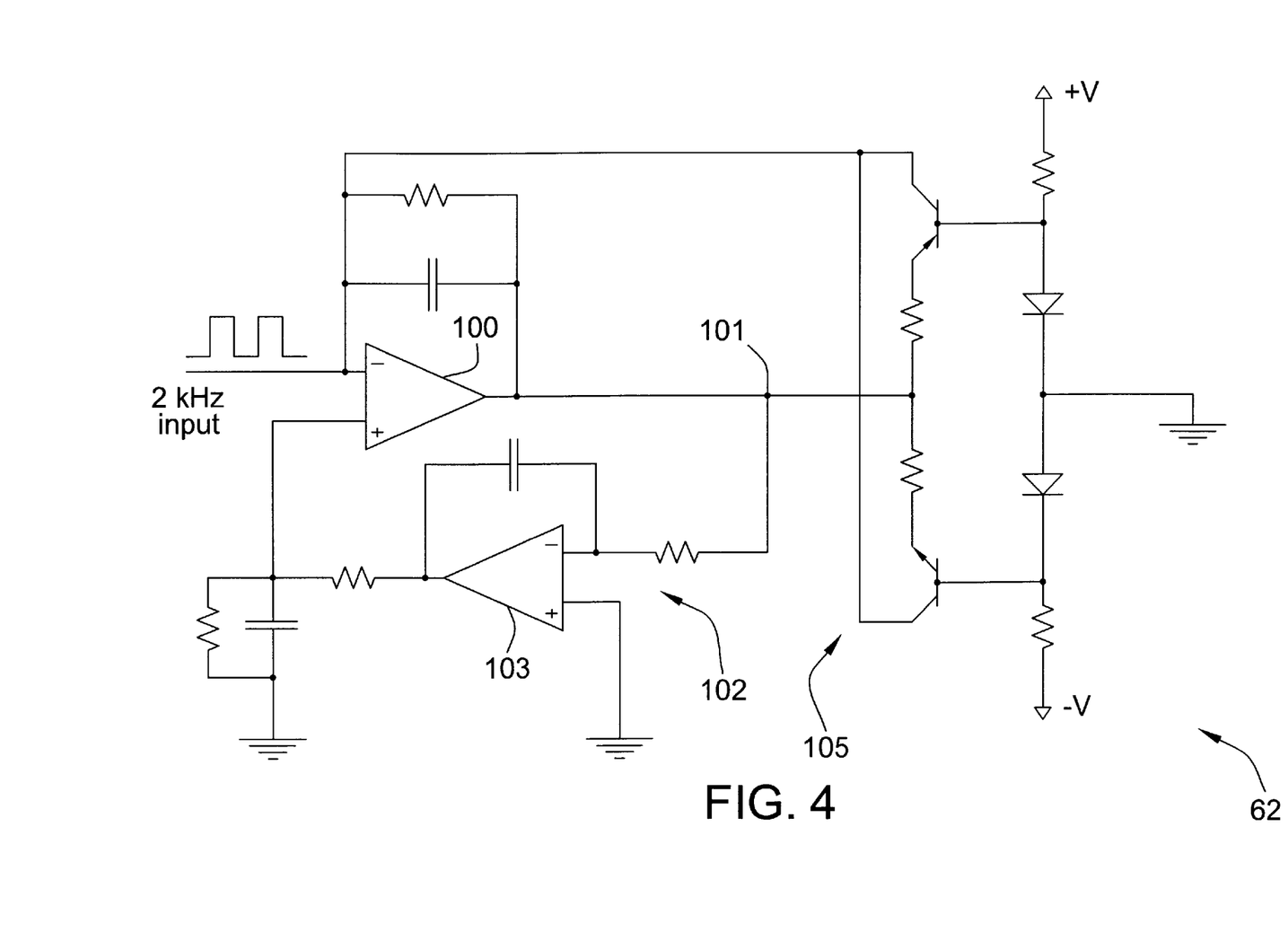
FIG. 4 is a schematic diagram illustrating one of the signal shaping circuits of the system of FIG. 3.

Turning to FIG. 4, there is shown additional detail of the signal shaping circuitry 62. To the left of the Figure is shown the 2 kHz square wave input which is produced by the current transformer. That signal is passed to an operational amplifier 100 connected to produce an amplified output signal at terminal 101 which is a known multiple of the input signal from the current transformer. A capacitor in the feedback path of the amplifier 100 reduces the susceptibility to noise. An auto zero circuit generally indicated at 102 includes a further operational amplifier 103 having its input connected to the terminal 101 and its output fed back to the non-inverting input of amplifier 100. Any DC shifts in the overall level of the output are thus neutralized by the auto zero circuit 102. An anti-saturation circuit generally identified at 105 includes a pair of transistors connected as illustrated which tend to keep the signal at the terminal 101 from oscillating when the circuit is strongly over driven. The result is an output at the terminal 101 which is an accurate representation of the input sensed by the current transformer and having a voltage level which is representative of that input signal. That voltage is then processed by the remaining circuitry as described above.

Figure 5:
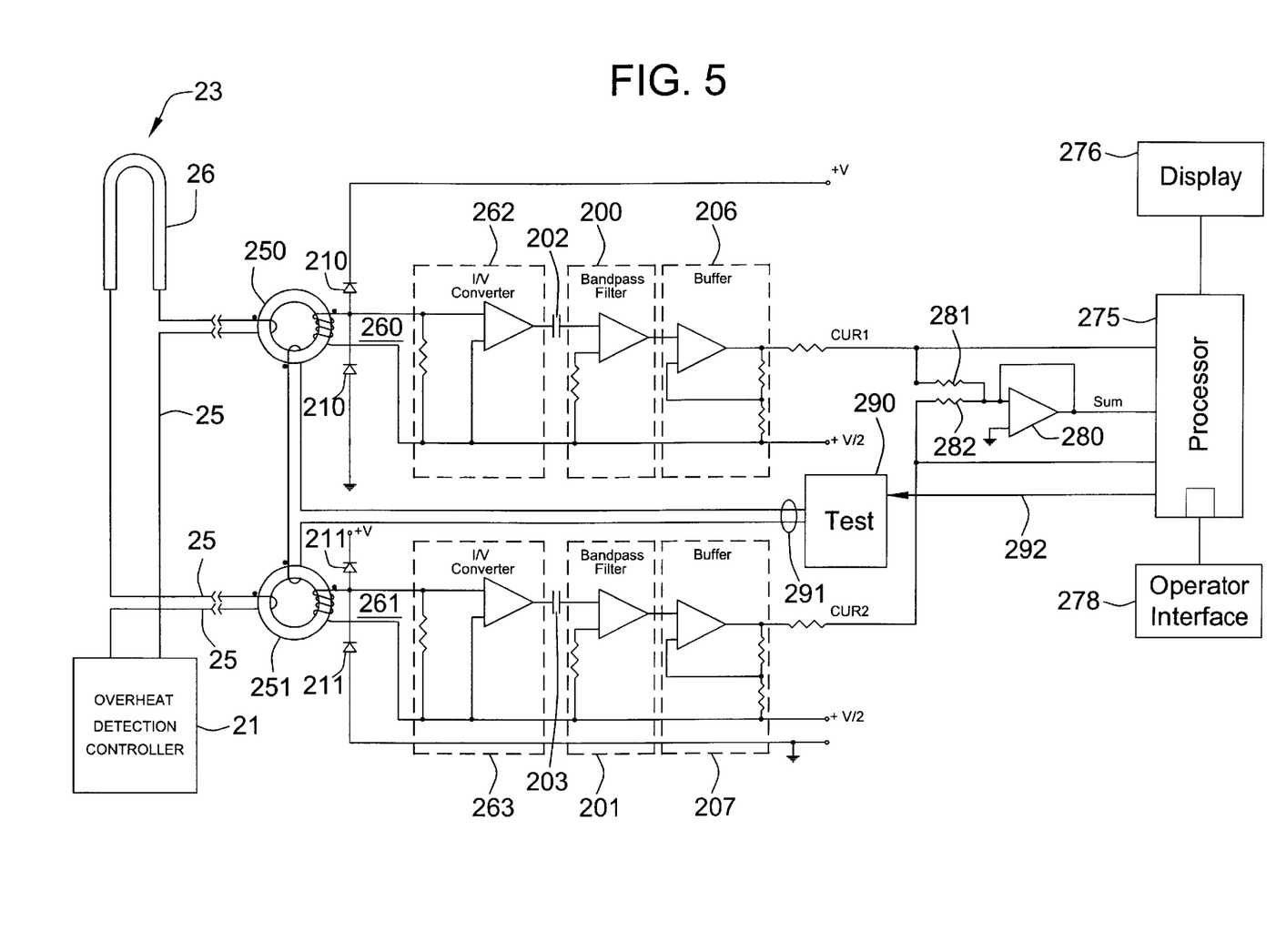
FIG. 5 is a schematic diagram, on the same general level as FIG. 3, but illustrating an alternative and currently preferred embodiment of the invention.

Turning now to FIG. 5, there is shown an alternative and currently preferred embodiment of an event location module constructed in accordance with the present invention. The processor components, to the right of FIG. 5, are substantially the same as those described in connection with FIG. 3. The current sensing circuitry in the FIG. 5 embodiment is somewhat different.

At a general level, both disclosed embodiments utilize a current to voltage converter for transforming the current signals which are picked up by the current sensor devices, into a voltage signal for further processing. In both cases the voltage signal is then processed to produce signals related to the magnitude and phase of the currents in the current sensors. That is accomplished in the FIG. 3 embodiment by utilizing timing extraction circuitry which samples the signal at appropriate times. In the FIG. 5 embodiment no timing circuitry is required. Instead, band pass filters process the signals to enhance signals in the bandwidth of interest and suppress signals outside that bandwidth. Like the FIG. 3 embodiment, in the FIG. 5, embodiment the current sensing circuitry produces Cur1 and Cur2 signals which have magnitudes and phases indicative of the current signals in the current transformers. The Cur1 and Cur2 signals are processed in a similar fashion to that which was described in connection with FIG. 3.

In greater detail, FIG. 5 shows a sensing loop 23 having an outer sheath 26 and an inner core 25 driven by a controller 21. As is shown in the drawings, the core 25 passes through the center of current transformers 250, 251. The outputs of the transformers 250, 251 are clamped by diodes 210, 211, so that the current signal will not exceed the power supply, and connected to a current to voltage converters 262, 263. The current to voltage converters 262, 263 may be based on that illustrated in FIG. 4, but need not include the auto-zero and anti-saturation circuits of that embodiment.

In practicing the FIG. 5 embodiment of the invention, the output signals from the current to voltage converters 262, 263 are passed to associated band pass filters 200, 201. In the illustrated embodiment, it is preferred that the coupling between the current to voltage converter and the band pass filter be AC coupling, and capacitors 202, 203 are interposed for that AC coupling aspect.

The band pass filters are not illustrated in detail, but simply shown as a block containing an amplifier. Numerous textbooks are available for constructing band pass filters according to desired characteristics. In the present case, the basic characteristic to be achieved by the band pass filters (assuming the use of a 2100 Hz operating frequency for the sensor loop in this example) is an operating center frequency of 2100 Hz. The low and high cutoff frequencies are set to attenuate typical aircraft induced noise (400 Hz) and any harmonics that may exist, such as distortions of the loop's center frequency.

The filtered 2100 Hz square wave which exits the band pass filters 200, 201 is then passed to buffer amplifiers 206, 207 where it is amplified to maximize signal to noise ratio. The output signals of the buffer amplifiers 206, 207 are identified as Cur1 and Cur2, to indicate that, as in the previous example, these signals represent the magnitude and phase of the currents sensed by the current transformers.

The processor 275 of the FIG. 5 embodiment is programmed in a similar fashion to that of the processor 75 of the FIG. 3 embodiment, insofar as the algorithms which implement bridge-type calculations to determine location information. The processor of the FIG. 5 embodiment, however, utilizes certain internal processing components to generate the "fault present" signal which, in the FIG. 3 embodiment, was produced by elements outside the processor.

Returning to FIG. 5, there is shown a summing amplifier 280 having an input resistor 281 coupled to the Cur1 signal and a input resistor 282 coupled to the Cur2 signal. The summing amplifier 280, like the summing amplifier 80 of the FIG. 3 embodiment thereby sums the magnitude and phase of the Cur1 and Cur2 signals as part of the production of the "fault present" signal. The sum signal produced by the summing amplifier 280 in the FIG. 5 embodiment is coupled directly to the processor 275, where it, like the Cur1 and Cur2 signals is digitized. The digitized sum signal is monitored by the processor to determine when it exceeds a predetermined programmed threshold. When the amplitude from the summing amplifier 280, which can be an RMS amplitude, exceeds a preset alarm threshold, the processor generates an internal "fault present" signal which commands the processor to invoke the algorithms to perform the aforementioned bridge-type calculations to determine event location information.

As a further alternative, it is also possible to move additional elements of the current sensing functionality within the processor. For example, since the processor is already digitizing the Cur1 and Cur2 signals, it is possible to utilize an algorithm within the processor to algebraically sum the magnitude and phase of those signals to produce an equivalent of the output of the summing amplifier 280 within the processor itself.

The system of FIG. 5 also includes a test module 290 having a pair or wires 291 which pass through both of the current transformers 50, 51 to form a complete loop beginning at the test module 290. The test module 290 is driven by an output line 292 from the processor. When the processor desires to test its event location circuitry, it sends a signal on the line 292 which causes the test module 290 to impose a small current on its output lines 291. The small current is passed through the current transformers 250, 251. The current is so small it does not effect the overall operation of loop 23. However, the magnitude of the test current is large enough to be sensed by the secondaries 260, 261, to produce signals which pass through the current to voltage converters, the band pass filters, and the buffer amplifiers to produce Cur1 and Cur2 signals which are summed and sensed by the processor.

It will also be apparent that certain aspects of FIGS. 3 and 5 can be combined, if desired, to achieve the benefits of the invention. For example, the partial internal processing of the "fault present" signal of FIG. 5 can be used in the implementation of FIG. 3. Numerous other modifications and combinations are possible.

Figure 6:
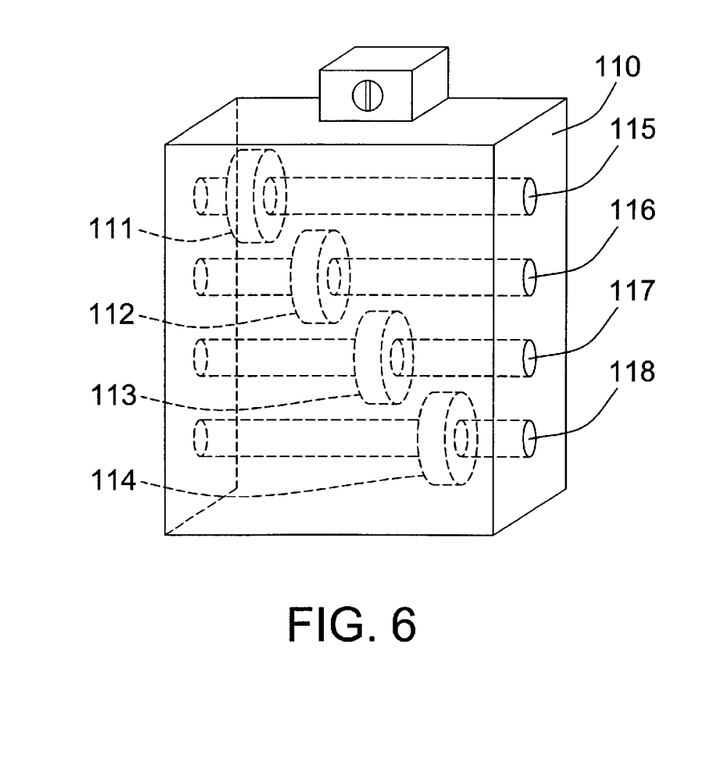
FIG. 6 is a diagram illustrating the configuration of a first form of line interface module which provides apertures through which the ends of the sensing loop can be passed.

As noted above, the line interface module which performs the actual interface to the overheat detection system can take a number of different forms. One of such forms is illustrated in FIG. 6. There is shown a module capable of handling two sensor loops. The module is simply a block, preferably of nonconductive, nonmagnetic material such as plastic. Within the block are positioned the current sensing elements. For example, torroids 111–114 are positioned in the block 110 and associated with bores 115–118. A sensing coil is wound on each torroid, as is usual. The wires from the sensing coils are not shown in FIGS. 6 or 7, but these are the wires which are connected to the sensing circuitry described above. The respective ends of the core of a loop are passed through, for example bores 115 and 116 such that the ends pass through the associated current transformers 111, 112. The ends of the core then pass out of the module 110 where they are connected to the overheat detection system controller. Wires of the loop need not be interrupted in any fashion, simply disconnected and reconnected with the module 110 in place.

Figure 7:
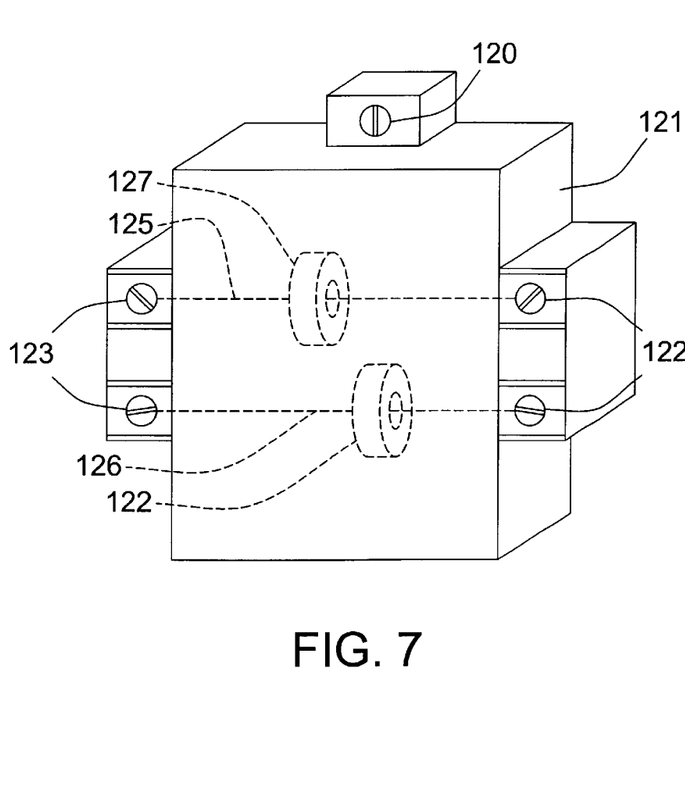
FIG. 7 is a diagram of a second form of loop interface module of the type configured as an aircraft terminal strip.

FIG. 7 shows another form of line interface module, in this case one which is capable of handling only a single loop. The module is configured much like a standard aircraft terminal block, and mounts to an appropriate portion of the aircraft by mounting screw 120. At the right of the module 121 is a pair of terminals 122 for connection to the core conductors of the cable loop. At the other end of the terminal block is a further pair of terminals 123 for connection to the bleed air monitoring computer. Simple wire conductors 125, 126 preferably molded into the block 121 connect the respective terminals to provide a simple and conventional shunt through the terminal block. The terminal block 121 is modified in this case to include cored openings to accept current sensing transformers 127, 128 through which the wire jumpers 125, 126 pass.

In both the cases of FIG. 6 and FIG. 7, the current transformer modules have appropriate output leads as was discussed in connection with FIG. 3 for providing sensed signals to the current sensing circuitry. In some cases it may be desirable to actually place a printed circuit board within the modules 110 or 121 to carry certain of the analog circuitry described in connection with FIGS. 3 and 5. In other cases, the modules will be located so close to the event location processor, that it will only be necessary to run the leads from the current transformers to the closely adjacent event location processor.

The foregoing description has focused on current transformers as the nonintrusive mechanism for sensing currents into the respective ends of a loop. Current transformers are the currently preferred embodiment, but are by no means the only type of non-intrusive current sensor which can be utilized. For example, Hall Effect devices can be located in the respective modules shown in FIGS. 6 and 7 in juxtaposition with the jumper wires or the actual loop core, and can sense the current flowing in the loop to provide signals to the controller indicative of both the magnitude and phase of the current.

The overheat detection system of the present invention, since it is based on existing sensor loops already in place, has limited accuracy but accuracy which will be acceptable for many conditions. However, there are certain situations, such as where the overheat may be on one side or the other side of a bulkhead, where it is important to isolate with precision on which side of the bulkhead the overheat condition has occurred. In practicing the invention, additional means are provided for isolating between sections of cable. Turning to FIG. 8, there is shown an isolation device 150. The isolation device is mechanically configured to match the mechanical configuration of the cable and its connectors. Typically, BNC-like connections are utilized to join cable ends. The isolation device 150 has male 151 and female 152 BNC-type ends, so that it is readily interposed between two cables using standard connection techniques. The sheath of the cable is electrically connected across the isolation device 150 by way of the metallic housing element of the connector. The core, however, has interposed a lumped resistance illustrated schematically at 155. The resistance may be on the order of 2–4 ohms, which is more than an order of magnitude larger than the resistance of a cable section. The zone isolation devices can be considered to electrically section the cable into zones defined between the isolation devices. Thus, in a system where isolation devices are utilized between each cable section, the event location panel will then act to isolate the fault to an individual cable section. The lumped resistance 155 in each of the isolation devices will make negligible the resistance of the sensor loop as well as any errors or inaccuracies in that loop. For example, if five isolation devices are distributed evenly along a sensor loop of 150 feet, the event location system will allow the pinpointing of the location of a leaky duct to an area 20 feet long. Maintenance crews can efficiently be dispatched to that area to correct the condition as opposed to spending hours of trial and error as the only recourse in troubleshooting the system on a hundred foot long duct.

It is anticipated that for retrofits with cables of reasonably good characteristics, the system can be implemented without the use of isolation devices. However, the isolation devices are a usefull tool in the event the cable system is so inaccurate that other means, short of a complete rebuild, are warranted to provide event location information.

It will now be apparent that what has been provided is a module which can be associated with and retrofit to an existing overheat detection system. The module makes its association with that existing system in a non-intrusive manner, such that it should not be necessary to re-certify the basic overheat detection system. The monitor system, however, by sensing only the currents flowing in the loop can distinguish several conditions including a non-overheat condition, a true overheat condition and a false overheat condition occasioned by operation of the test switch. The system is capable of distinguishing between the three such that it measures and stores position information for an overheat event only in the event of a true overheat condition. The system is thus highly economical in allowing retrofit to existing aircraft without the need for extensive modifications, such as removing entire systems. And it provides maintenance personnel with the capability of saving significant time in troubleshooting overheat conditions, by leading such personnel to the location of the overheat fault, so as to avoid the necessity for disassembling significant portions of the aircraft to find an overheat condition as had been done in the past.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A non-intrusive event location system configured to be retrofit to an overheat detection system which includes a controller and an elongate cable having a central conductor and a sheath separated by insulation capable of locally forming a conductive path between the conductor and sheath in the presence of an overheat condition, the controller having a run mode in which an alternating current drive is coupled to both ends of the cable to sense for an overheat condition, and test mode which grounds one end of the cable and drives the other, the event location system comprising in combination:

a pair of non-intrusive current sensor circuits, one for each of the cable ends, and arranged to sense the magnitude and phase of current in the cable and produce associated output signals, a processor for monitoring the output signals and programmed to perform a calculation identifying the location of an overheat event along the cable based on the output signals and to store event location information on command, a "fault present" circuit connected to receive the output signals and configured to respond to the magnitude and respective phase thereof to command the processor perform said calculation when the magnitude of the output signals indicates a possible overheat event and the phase of the output signals indicates operation in the run mode.

2. The combination as set forth in claim 1 wherein the current sensor circuits are associated with the cable to produce in phase current signals when the overheat detection system is in the run mode and, due to reversal of current through one of the sensor circuits, out of phase current signals when the overheat detection system is in the test mode.

3. The combination as set forth in claim 1 wherein the current sensor circuits include band pass filters tuned to the frequency of the alternating current drive and adapted to reject spurious signals at frequencies outside the pass band thereof.

4. The combination as set forth in claim 1 wherein the current sensor circuits include timing circuitry responsive to the frequency of the alternating current drive for extracting output signals having magnitudes related to current in the cable.

5. The combination as set forth in claim 1 wherein the "fault present" circuit includes a summing amplifier and threshold element connected to an interrupt input of the processor.

6. The combination as set forth in claim 1 wherein the "fault present" circuit includes program modules in the processor for determining when the output signals are indicative of operation in the run mode.

7. The combination of claim 1 wherein the "fault present" circuit includes a summing amplifier connected to receive the respective output signals and to compare their magnitude and phase.

8. The combination as set forth in claim 7 wherein the "fault present" circuit commands the processor to sample the respective output signals, perform the programmed computation on the sampled signals, to repeat the sampling and computation on a plurality of subsequently sampled signals, to compute averages from the aforementioned computations, and to store event location information relating to the averages.

9. The combination as set forth in claim 8 wherein the event location information includes time related information identifying the time of occurrence of the overheat event, and location information indicating where along the cable the overheat event occurred.

10. The combination as set forth in claim 1 wherein each current sensor comprises a current transformer having an open core through which a respective end of the central conductor of the cable is passed.

11. The combination of claim 1 wherein the current transformers are mounted in a terminal block to which the controller and the cable are connected, the terminal block having a terminal block conductor passing through the core of the current transformer.

12. The combination of claim 1 wherein the current sensors each comprise a Hall Effect detector positioned to sense current flow in the respective ends of the cable.

13. The combination of claim 1 further including zone isolation devices containing lumped resistances, the zone violation devices being connected in the cable so as to electrically section the cable to assist in fault location.

14. A non-intrusive event location system configured to be retrofit to an overheat detection system which includes a controller and an elongate cable having a central conductor and a sheath separated by insulation capable of locally forming a conductive path between the conductor and sheath in the presence of an overheat condition, the controller having a run mode in which an alternating current drive is coupled to both ends of the cable to sense for an overheat condition, and test mode which grounds one end of the cable and drives the other, the event location system comprising in combination:

a pair of non-intrusive current sensors, one for each of the cable ends, and arranged to sense the current in the cable driven by said controller without interposing any electronic components in the path of said current from the controller to the cable, current sensing circuitry connected to the pair of current sensors to produce output signals related in magnitude and frequency to the alternating drive currents picked up by the current sensors, a processor for monitoring the output signals and programmed to perform a calculation identifying the location of an overheat event along the cable based on the output signals and to store event location information in response to a command signal, a "fault present" circuit connected to receive the output signals and responsive to their magnitude and respective phase to produce a command signal for the processor when the magnitude of the output signals indicates a possible overheat event and the phase of the output signals indicates operation in the run mode.

15. The combination as set forth in claim 14 wherein the current sensors are associated with the cables to produce in phase current signals when the overheat detection system is in the run mode and, due to reversal of current through one of the sensors, out of phase current signals when the overheat detection system is in the test mode.

16. The combination as set forth in claim 14 wherein the current sensor circuits include band pass filters tuned to the frequency of the alternating current drive and adapted to reject spurious signal at frequencies outside the pass band thereof.

17. The combination as set forth in claim 14 wherein the current sensor circuits include timing circuitry responsive to the frequency of the alternating current drive for extracting output signals having magnitudes related to current in the cable.

18. The combination as set forth in claim 14 wherein the "fault present" circuit includes program modules in the processor for determining when the output signal are indicative of operation in the run mode.

19. The combination of claim 14 wherein the "fault present" circuit includes a summing amplifier connected to receive the respective output signals and to compare their magnitude and phase.

20. The combination as set forth in claim 14 wherein each current sensor comprises a current transformer having an open core through which a respective end of the central conductor of the cable is passed.

21. The combination of claim 14 wherein the current transformers are mounted in a terminal block to which the controller and the cable are connected, the terminal block having a terminal block conductor passing through the core of the current transformer.

22. The combination of claim 14 wherein the current sensors each comprise a Hall Effect detector positioned to sense current flow in the respective ends of the cable.

23. The combination of claim 14 further including zone isolation devices containing lumped resistances, the zone violation devices being connected in the cable so as to electrically section the cable to assist in fault location.

24. A method, practiced with an overheat detection system, of providing event location information from currents flowing in the overheat detection system, the overheat detection system being of the type which includes a controller and an elongate cable having a central conductor and a sheath separated by insulation capable of locally forming a conductive path between the conductor and sheath in the presence of an overheat condition, the controller having a run mode in which an alternating current drive is coupled to both ends of the cable to sense for an overheat condition, and test mode which grounds one end of the cable and drives the other, the method comprising the steps of:

utilizing non-intrusive current sensors to pick off currents flowing in the cable as driven by the controller;

processing the picked off current signals to produce output signals having a magnitude and phase related to the current flowing in the cable;

responding to the magnitude and phase of the output signals to distinguish a true overheat condition from a normal condition or a false overheat condition produced in the test mode; and in the presence of a true overheat condition commanding a processor to perform a calculation on the output signals identifying the location of an overheat event along the cable based on the output signals, and to store event location information.

* * * * *